United States Patent [19]
Fields

[11] Patent Number: 5,660,154
[45] Date of Patent: Aug. 26, 1997

[54] CRANKANGLE DEDICATED SEQUENTIAL INDUCTION FOR MULTI-CYLINDER ENGINES

[76] Inventor: Martin C. Fields, 4192 Nowata Dr., NE., Roswell, Ga. 30075-1650

[21] Appl. No.: 288,452

[22] Filed: Aug. 9, 1994

[51] Int. Cl.$^6$ .................................................. F02B 75/00
[52] U.S. Cl. .......................................................... 123/184.42
[58] Field of Search ................. 123/184.31, 184.32, 123/184.33, 184.34, 184.35, 184.37, 184.38, 184.39, 184.42, 184.45, 184.47, 184.52, 184.53, 184.57, 184.59, 54.6, 54.7

[56] References Cited

U.S. PATENT DOCUMENTS

| | | | |
|---|---|---|---|
| 1,133,528 | 3/1915 | Bennett | 123/184.39 |
| 2,163,040 | 6/1939 | Jacoby . | |
| 3,692,006 | 9/1972 | Miller et al. | 123/55 |
| 3,708,980 | 1/1973 | Truxell | 60/274 |
| 3,768,248 | 10/1973 | Grgurich et al. | 60/13 |

(List continued on next page.)

OTHER PUBLICATIONS

Tri–Y V–8 Exhaust Header–Firing Order:1, 8, 4, 3, 6, 5, 7, 2.
180 Degree Exhaust Headers–Firing Order:1, 8, 4, 3, 6, 5, 7, 2.
"Manifold Designs"; (Publication Date Unknown); p. 139; Chevy High Performance Magazine.
"The Pipes Are Callling"; Oct., 1993; p. 50; Chevy High Performance Magazine.
4–2–1 Exhaust Manifold–Firing Order: 1, 3, 42.
GM's Dual Plane 180° Intake Manifold–Firing Order 1, 8, 4, 3, 6, 5, 7, 2.

*Primary Examiner*—Marguerite McMahon
*Attorney, Agent, or Firm*—Harry I. Leon

[57] ABSTRACT

An improved intake manifold, for uniformly charging each cylinder of a multi-cylinder internal combustion engine. The manifold comprises a structure having bifurcated branches which define multiple through passageways, each passageway fluidly connecting the air inlet of the manifold to the intake valve chamber of one of the cylinders. For eight-cylinder engine, each through passageway encounters four fluid flow channels distinguishable by three bifurcations in the structure between the intake valve chamber at which the passageway terminates and the air inlet. The engine firing sequence dictates which through passageways share a fluid flow channel in common beyond each successive bifurcation in the structure. The through passageways are grouped together so that the frequency of passage of a fuel/air mixture through that portion or stage of each through passageway located immediately upstream of any given bifurcation is twice the frequency of passage of such a mixture through that stage of the through passageway located immediately downstream thereof. Downstream of each final bifurcation, a fuel/air mixture can be fed into either of two intake valve chambers but only at intervals 360 degrees of crankshaft revolution apart. Since racing engines operate with each intake valve open for roughly 300 degrees of the crankshaft revolution, only one intake valve is ever open at any given time downstream of each final bifurcation, providing a maximum separation between the closing of one intake valve and the opening of another both fed by through passageways paired at the final bifurcation.

25 Claims, 8 Drawing Sheets

U.S. PATENT DOCUMENTS

| | | |
|---|---|---|
| 3,783,843 | 1/1974 | McFarland, Jr. . |
| 3,931,811 | 1/1976 | McFarland, Jr. . |
| 4,034,562 | 7/1977 | Taguchi et al. .................... 60/282 |
| 4,094,276 | 6/1978 | Nakamura et al. . |
| 4,116,172 | 9/1978 | Lohr et al. ...................... 123/52 |
| 4,119,067 | 10/1978 | Aldrich et al. . |
| 4,182,121 | 1/1980 | Hall ................................ 60/313 |
| 4,300,488 | 11/1981 | Cser ............................ 123/184.57 |
| 4,318,371 | 3/1982 | McFarland ................... 123/184.35 |
| 4,325,346 | 4/1982 | Yokoyama .................. 123/184.39 |
| 4,353,211 | 10/1982 | Cser et al. ................... 123/184.57 |
| 4,409,934 | 10/1983 | Kaindl . |
| 4,501,235 | 2/1985 | Muller . |
| 4,510,896 | 4/1985 | Rutschmann . |
| 4,513,699 | 4/1985 | Cser ............................ 123/184.57 |
| 4,517,951 | 5/1985 | Otaka et al. . |
| 4,543,918 | 10/1985 | Ma . |
| 4,577,596 | 3/1986 | Senga . |
| 4,664,075 | 5/1987 | Poulos . |
| 4,686,944 | 8/1987 | Hiraoka et al. . |
| 4,731,995 | 3/1988 | McFarland, Jr. ................ 60/313 |
| 4,741,295 | 5/1988 | Hosoya et al. . |
| 4,760,819 | 8/1988 | Vorum . |
| 4,765,137 | 8/1988 | Sakurai et al. .................. 60/313 |
| 4,787,342 | 11/1988 | Matsumori et al. ............ 123/54.6 |
| 4,800,720 | 1/1989 | Okada ............................. 60/313 |
| 4,805,564 | 2/1989 | Hudson, Jr. . |
| 4,835,965 | 6/1989 | Poehlman ....................... 60/313 |
| 4,840,029 | 6/1989 | Sakurai et al. .................. 60/313 |
| 4,932,369 | 6/1990 | Parr . |
| 4,957,070 | 9/1990 | Ofria et al. . |
| 4,970,994 | 11/1990 | Sawada et al. . |
| 5,009,200 | 4/1991 | var Basshuysen et al. . |
| 5,010,731 | 4/1991 | Onishi ............................ 60/313 |
| 5,012,771 | 5/1991 | Oda et al. . |
| 5,016,579 | 5/1991 | Suzuki et al. . |
| 5,050,378 | 9/1991 | Clemmens ..................... 60/313 |
| 5,072,583 | 12/1991 | Urushihara ..................... 60/313 |
| 5,076,218 | 12/1991 | Graziadei . |
| 5,085,178 | 2/1992 | Hitomi et al. .............. 123/184.31 |
| 5,101,626 | 4/1992 | Blair ............................... 60/313 |
| 5,127,371 | 7/1992 | Ogawa et al. . |
| 5,129,368 | 7/1992 | Kristt et al. . |
| 5,209,191 | 5/1993 | Kopec . |

CRANKANGLE DEDICATED SEQUENTIAL INDUCTION FOR MULTI-CYLINDER ENGINES

BACKGROUND OF THE INVENTION

The present invention relates to an improvement in the intake manifold structure for any two- or four-stroke internal combustion engine having an even number of cylinders above four. Among the engines on which this manifold structure can be mounted are typical V-8 engines, each such engine having two banks of cylinders, one disposed on the left and one on the right. An intake manifold for distributing charges of fuel and air or of air alone among the respective cylinders is interposed between the left and right cylinder banks.

Engine performance can be enhanced by using a manifold in which the resistance to fluid flow therewithin is minimized and in which the inertia of the intake air is utilized to advantage. Resistance to fluid flow varies with the cross-sectional flow area and length of each passageway within the manifold connecting the air inlet thereof to an individual cylinder of the engine. Fluid flow resistance is also dependent upon any changes in cross-sectional area along the passageway. The inertia of the intake air gives rise to flow pulses caused by pressure waves bouncing off of just-closed air intake valves. In good manifold design, the flow pulses are minimized and even used to help pressurize the flow entering yet-to-be-charged cylinders as they are being fed sequentially in the firing order.

In addition, the need for a manifold capable of providing a uniform distribution of fluid flow to all engine cylinders has long been recognized. Uneven filling of cylinders with their respective charges of fuel and air or of air alone results in each cylinder not doing the same of work. An attempt solving this problem is found in U.S. Pat. No. 2,163,040, where, as early as 1939, Jacoby provided a manifold for a four cylinder engine.

Aldrich and Sawruk, in U.S. Pat. No. 4,119,067, which issued in 1978, improved upon Jacoby's combination by centrally locating the carburetor on a four cylinder engine between its second and third cylinders.

Vorum, in U.S. Pat. No. 4,760,819, which issued in 1988, disclosed a manifold on which the carburetor is symmetrically positioned with respect to the cylinders of a four-cylinder engine. Vorum also realized that an intake manifold can be divided into sets of primary and secondary runners for use on such an engine.

Oda et al., in U.S. Pat. No. 5,012,771, issued in 1991, realized the advantages of having a manifold for a four-stroke engine wherein the manifold has-two groups of discrete intake passages connected to two groups of cylinders which in each and the same-group are not intended to be fired one after another, respectively.

With respect to pioneering work outside of the patent literature, Edlebrock, beginning in 1938, sought to minimize the effects of the same portion of the manifold simultaneously feeding charges to two cylinders of a V-8 engine. However, Edelbrock's manifolds, including his dual layer models, allow for a substantial amount of interference to occur between charges fed into even those pairs of cylinders most separated from each other in the firing sequence. In his combinations, these pairs of cylinders are fluidly connected in such a way that a charge must be fed every 180 degrees of crankshaft revolution through a passageway shared in common by the cylinders and located immediately upstream of the flow channel serving each cylinder individually.

Similarly, until now, improved manifolds for six cylinder engines have still allowed two or more cylinders to be open simultaneously to the intake side of the engine, in a configuration in which the cylinders are fluidly connected to a passageway which they share in common and which is so located immediately upstream relative to the individual cylinders. Prior art improvements in manifolds for six cylinder engines have been directed towards increasing the length of the interval separating the flow of charges to cylinders which are fluidly interconnected in groups of threes rather than in the optimum groups of twos.

The state-of-the-art with respect to various manifolds for six cylinder engines can be appreciated by comparing the exact number of degrees of crankshaft revolution during which two or more cylinders are open, hereinafter referred to as the "simultaneously-open valves interval." For a given engine, this interval is determined by subtracting the number of degrees of crankshaft revolution during which charge passes through the first passageway which two or more cylinders share in common located upstream of their individual fluid flow channels, this number of degrees being hereinafter referred to as the "first common upstream section pulse interval", from the total number of degrees of crankshaft revolution during which any one cylinder remains open, hereinafter referred to as the "open valve duration". In a typical racing engine, the "open valve duration" is roughly 300 degrees.

Manifolds six-cylinder engines in which one flow channel at the air inlet branches into six runners, each runner being fluidly connected to one of the cylinders, have a "first common upstream section pulse interval" of 120 degrees. The "simultaneously-open valves interval" for two intake valves with such a manifold is then 180 degrees of crankshaft revolution. During this 180 degree interval, three intake valves will be open simultaneously 60 degrees, the valves being in varying states of travel.

Alternately, more advanced manifolds for six-cylinder engines according to the prior art have one flow channel at the air inlet branching into two transfer sections, each section feeding a bank of the engine and branching into three runners, each runner being fluidly connected to one of the cylinders. Such manifolds have a "first common upstream section pulse interval" or pulse interval of each bank of 240 degrees. With such a manifold, the "simultaneously-open valves interval" is reduced to 60 degrees (still substantially greater than 0 degrees), during which two intake valves are open simultaneously, of each crankshaft revolution.

In general, for engines having six or more cylinders, the prior art has failed to solve those problems which are caused by having two or more cylinders open simultaneously in a manifold configuration in which these cylinders are fed by a flow passageway they share in common located immediately upstream of those flow channels serving the individual cylinders, respectively.

SUMMARY OF THE INVENTION

The primary object of this invention is to provide an improved manifold for an internal combustion engine having greater than four cylinders in which the manifold can evenly distribute charges of air/fuel mixture or of air alone to the cylinders as well as take advantage of the pulsed nature of the flow of these charges.

A further object of this invention is to provide an improved manifold which evenly separates, by a certain number of degrees of crankshaft revolution, each charge as the charge is being fed into each cylinder of an internal combustion engine from any charges previously fed, or which might be subsequently fed, into those cylinders closest to said cylinder in the firing sequence of the engine.

A still further object of this invention is to provide an improved manifold-having means for isolating, in varying degrees, charges as they are moving through passageways feeding into the individual cylinders of the engine, the degree of isolation increasing with the proximity of the cylinders to each other in the firing sequence of the engine, so that charges fed into those cylinders which are fired immediately one after the other are most isolated from each other.

A still further object of this invention is to provide a manifold having much better flow characteristics due to charge separation which not only results in the virtual elimination of interference between incoming flow and pressure waves created in the manifold when previously-filled intake valves close but also allows such a pressure wave to build at the right instant to help initiate flow into an intake valve that is about to open rather than to hamper its flow.

An additional object of the present invention is to provide an improved manifold having fluid flow channels with large enough cross-sectional areas to accommodate increased cylinder charging through the utilization of lower than usual without these flow velocities being too low for efficient cylinder filling at low engine speeds.

Another additional object is to provide an improved manifold which can be used to broaden the rpm range of useable torque for an engine while flattening its torque curve, the manifold being tuned to achieve multiple individual torque boosts.

In accordance with the present invention, there is provided an improved manifold for engines having more-than four cylinders, the manifold having progressively branching sections which define multiple through passageways, each passageway fluidly connecting the air inlet of the manifold to the intake valve chamber of one of the cylinders. With this manifold, charges are fed through one of a plurality of shared flow channels, to either of two cylinders fluidly connected thereto, each shared flow channel being disposed at one of the points of branching located furthest downstream, the charges flowing through the shared flow channel to the individual cylinders being separated by 360 degrees of crankshaft revolution for a four-stroke engine and 180 degrees for a two-stroke engine.

Moreover, each successive branching along each of the through passageways adds another degree of freedom in the design of a manifold. For improved manifold, according to the present invention, these degrees of freedom can be utilized to enhance the engine efficiency over a wide range of engine speeds. Each additional degree of freedom can be translated into another separate torque peak, created by resonance phenomena, each torque peak being a function of the revolutions per minute (rpm) of the engine. The improved manifold according to the present invention provides three degrees of freedom for-the six-cylinder engine, four degrees of freedom for the eight-cylinder engine and for the twelve-cylinder engine and five degrees of freedom for the sixteen-cylinder engine.

For a typical eight-cylinder engine, the manifold comprises an air inlet section, a transfer section, a distribution section and an air intake port extension section. The air inlet section branches into two transfer sections, each transfer section itself branches into two distribution sections, and each of the distribution sections branches into two individual air intake port extensions.

The air inlet section of the improved manifold for an eight-cylinder engine takes in a charge of fuel/air or of air alone every 90 degrees of crankshaft revolution while a charge flows through each dual transfer section every 180 degrees. Flow through any one of the four distribution sections does not occur again until the engine has advanced half-way (360 degrees) through its firing order. Hence, for a typical engine in which any one intake valve is open for but 300 degrees of crankshaft revolution, only one of the two intake valves which can be fed by a given distribution section is being serviced at any given time.

Two preferred embodiments include a first manifold having a multi-layered structure defining the distribution sections and a second manifold having dual branches formed at each of several Ys, the branches forming a structure disposed symmetrically about a vertical plane which generally bisects the structure of Ys longitudinally. In both of these embodiments, both the air inlet section and the dual transfer sections are virtually the same.

Improved manifolds according to the present invention utilizing the multi-layered structure can be used on any conventional four-stroke, V engine, including V-6, V-8 and V-12 engines. The alternate embodiment, on the other hand, requires, for eight-cylinder engines, the following dedicated firing order:

1-6-5-2-3-8-7-4.

For V-8 engines having a conventional crankshaft configuration, the improved manifold having the multi-layered structure comprises three layers. The lower and middle layers thereof comprise two distribution sections, each section discharging through two branches or intake port extensions. Each of the two intake port extensions supplied by each of these layers feeds charges of fuel/air or of air alone to a cylinder located in a different bank of the engine than the other intake port extension supply by the same layer. The upper layer, by contrast, defines four intake port extensions, two of these extensions feeding one engine bank and two the other bank.

For example, an improved manifold having a multi-layered structure suitable for use with a V-8, four-stroke engine, such as that utilized by Chevrolet, has an upper layer defining four intake port extends which feed cylinders 3, 5 and 8. The middle layer has extensions supplying cylinders 4 and 7; and the lower layer cylinders 1 and 6. With this three-layer delivery system, no distribution section has to share an inlet flow to two cylinders simultaneously. For example, immediately after cylinder 1 is fed from the lower layer, the next firing cylinder, cylinder 8, is fed from the top layer. Moreover, the pressure pulse from the closing of intake valve 1 immediately enters the lower layer distribution section where the pressure pulse aids in initiating flow from the same distribution section into cylinder 6.

The improved manifold having a multi-layered structure is further characterized by having each of the through passageways linking one of the intake valves to the carburetor, or the like, being approximately the same in length as any one of the other through passageways.

In an alternate embodiment for a V-8 engine comprising dual branches formed at each of seven Ys, the branches forming a structure disposed symmetrically about a vertical plane bisecting the structure longitudinally, each transfer section has a common fluid flow channel dedicated to through passageways linking the air inlet of this manifold to cylinders within one particular bank of the engine. Preferably, the symmetrically disposed flow paths for the through passageways of this embodiment are designed to have sweeping, gradual turns in direction.

Preferred embodiments of the improved manifold suitable for six-cylinder engines comprise an air inlet section which branches into three transfer sections, each of the transfer sections branching into two intake port extensions. For an in line engine having a firing order of 1-5-3-6-2-4, the three transfer sections are grouped to supply charges to cylinders and 6; 2 and 5; and 3 and 4, respectively, thereby giving a maximum time interval between charges passing through the same transfer section. Similarly, for a V-6 engine such as a Chevrolet which has a firing order of 1-6-5-4-3-2, the three transfer sections are grouped to supply charges to cylinders 1 and 4; 3 and 6; and 2 and 5, respectively, again giving a separation corresponding to 360 degrees crankshaft revolution before the next cylinder is again fed by the same distribution section.

While embodiments have been disclosed for use with V-8 and six-cylinder engines, the same design philosophy can be equally well applied to any engine having an even number of cylinders. That is, sequential discharges from the manifold to its respective intake valves do not simultaneously traverse the same distribution section but rather are separated from each other by a time interval corresponding to 360 degrees of crankshaft revolution for a four-stroke engine, or 180 degrees for a two-stroke engine, before the next cylinder is again fed through the same distribution section. That is, the design of the manifold is such that sequential discharges from the manifold to its respective intake valves occur in the same distribution section but are as far removed from each other in degrees of crankshaft revolution as is possible. Furthermore, the pressure pulse created on an intake valve closing is sent to the immediately upstream distribution section at an instant when the pressure pulse can be most helpful. By a timely increase in the local pressure differential, the pressure pulse initiates flow from the same distribution section to the intake port extension of the next cylinder in the charging sequence.

DETAILED DESCRIPTION OF THE PREFERRED EMBODIMENTS

The present invention will be described more in detail with reference to the accompanying drawings. Corresponding reference characters indicate corresponding parts throughout the several views of the drawings.

The drawings illustrate four embodiments/of the manifold according to the present invention. The first of these embodiments, which includes a tri-layered structure, is indicated generally by the reference numeral 10.

As illustrated in FIGS. 1–6, the manifold 10 can be mounted using a mounting flange, an example of which is shown in dashed lines on a typical V-8 block such as the small block Chevrolet engine. The small block Chevrolet engine is used for illustrative purposes only and slight modifications of the manifold 10 will allow it to be used on other V-8 engines. The manifold 10 is mounted in the center of the V so that the distance which fluid must travel from the air inlet of the engine to each of the cylinders is approximately the same for all of them.

The manifold 10 has the following major components: an air intake section 11, transfer sections 12, 13, distribution sections 14, 15, 16, 17, and intake port extensions 21, 26, 34, 37, 42, 43, 45, 48. Air intake section 11 is fluidly connected to transfer sections 12, 13 which in turn are fluidly connected to distribution sections 14 and 15; 16 and 17, respectively. Distribution sections 14, 15, 16, 17 are themselves fluidly connected to intake port extensions 34 and 37; 21 and 26; 42 and 43; 45 and 48, respectively. The intake valve chambers of the engine are fluidly connected to the distribution sections by the intake port extensions 21, 26 protruding from the lower layer 20 of the tri-layered structure, extensions 34, 37 protruding from its middle layer 30 and extensions 42, 43, 45, 48 protruding from its upper layer 40.

The manifold 10 also includes provisions for the installation of fuel injectors which can be located in mounting holes 51, 52, 53, 54, 55, 56, 57 and 58.

EXAMPLE 1

Figure 1:
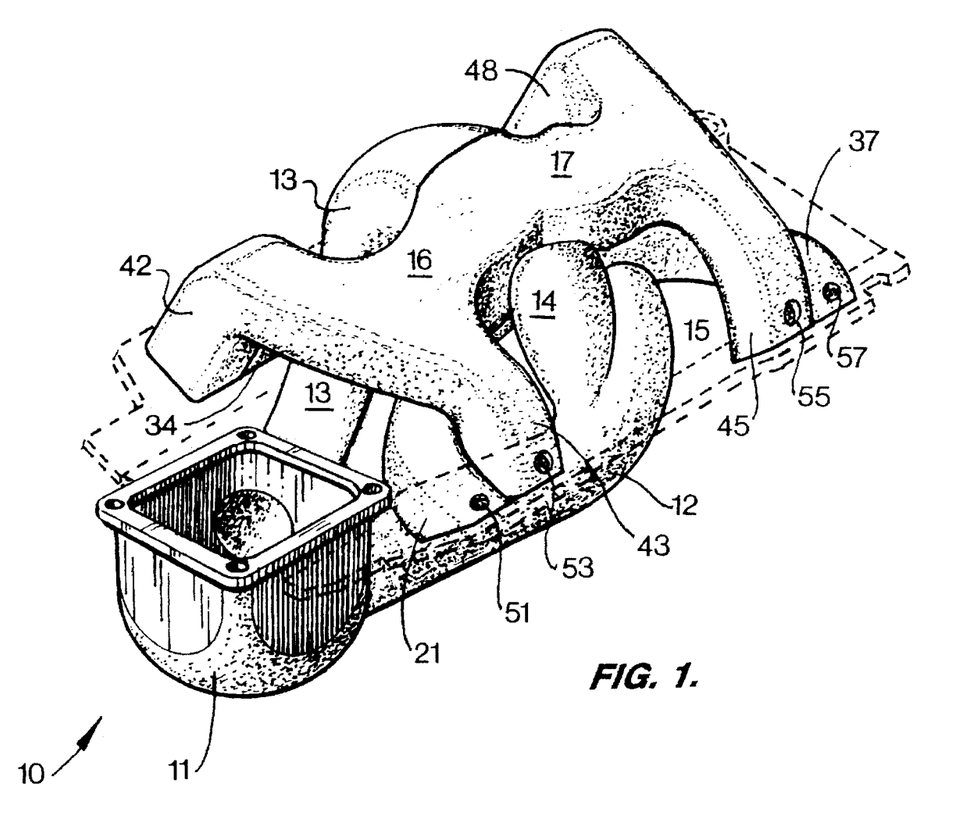
FIG. 1 is a perspective view of one embodiment of the intake manifold according to the present invention, the mounting flange used to connect the manifold to the engine being shown in dashed lines.
Figure 2:
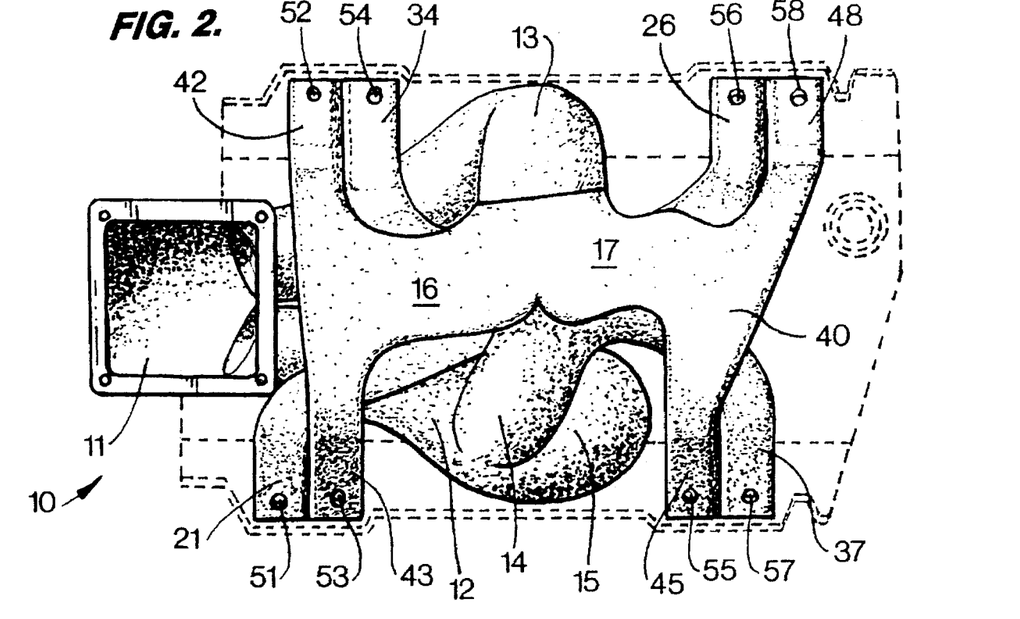
FIG. 2 is a top plan view of the intake manifold according to FIG. 1, the mounting flange used to connect the manifold to the engine being shown in dashed lines.
Figure 3:
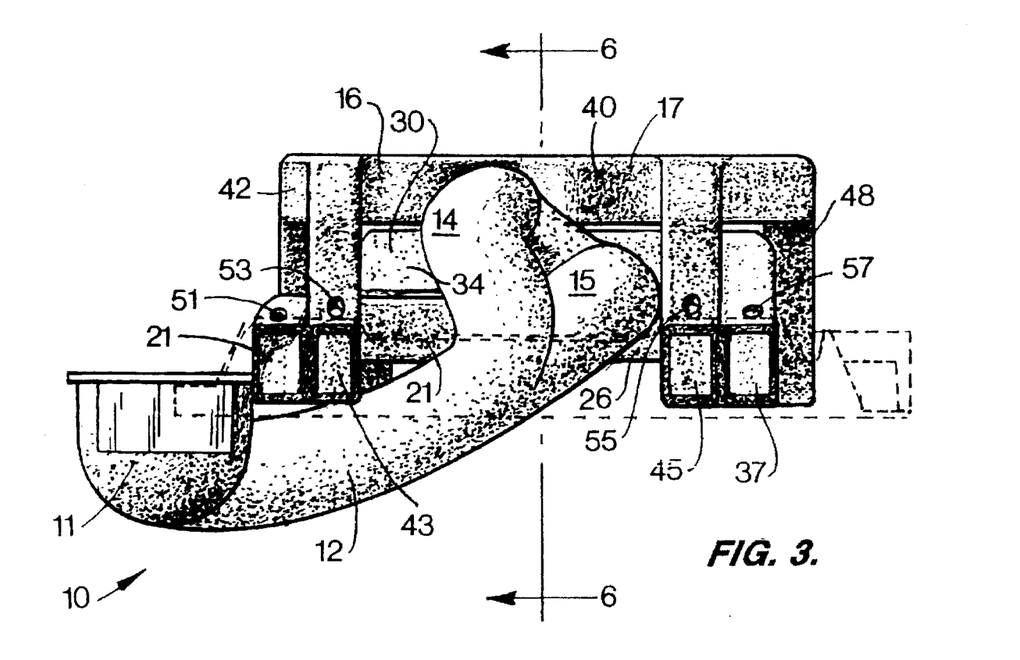
FIG. 3 is a right side elevational view of the intake manifold according to FIG. 1, the mounting flange used to connect the manifold to the engine being shown in dashed lines.
Figure 4:
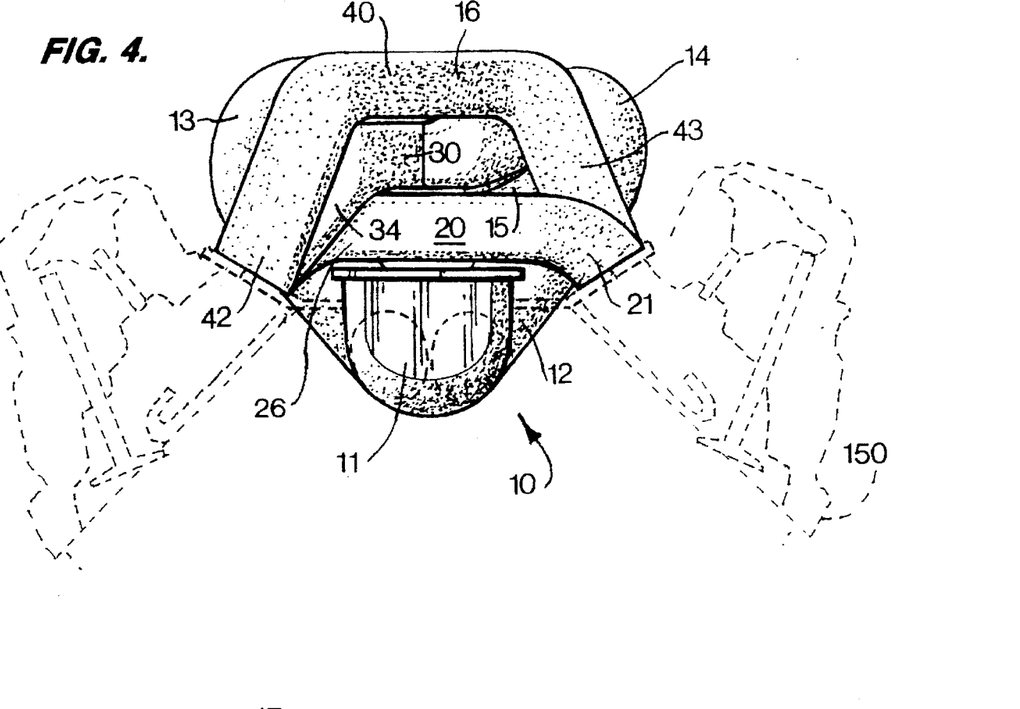
FIG. 4 is a front end view of the intake manifold according to FIG. 1, the mounting flange-used to connect the manifold to the engine and the engine cylinder heads being shown in dashed lines.
Figure 5:
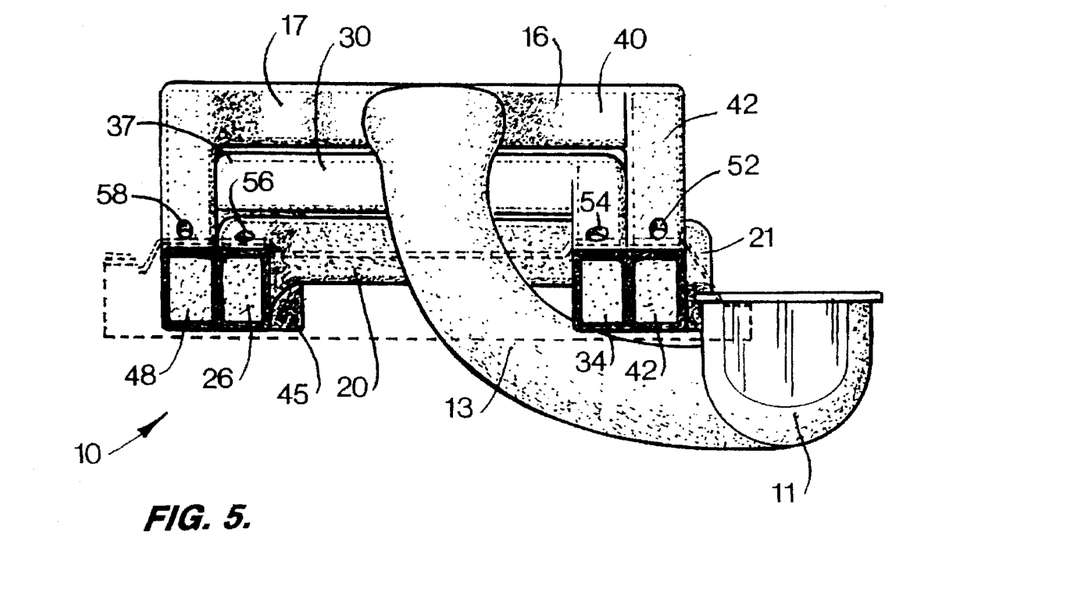
FIG. 5 is a left side elevational view of the intake manifold according to FIG. 1, the mounting flange used to connect the manifold to the engine being shown in dashed lines.

In a typical application, manifold 10 is utilized on a small block Chevrolet V-8 engine. The Chevrolet V-8 engine is arranged in two banks of cylinders, right and left, looking from the front of the vehicle. The cylinders of this engine number from the front with the front right cylinder being cylinder 1, the front left 2, the second-from-the-front right 3, the second-from-the-front left 4, the third-from-the-front right 5, the third-from-the-front left 6, the fourth-from-the-front right 7, and the fourth-from-the-front left 8. The ignition firing order for this V-8 engine is 1-8-4-3-6-5-7-2, and the cylinders are fired in sequence at intervals which are 90 degrees of crankshaft revolution apart.

Figure 6:
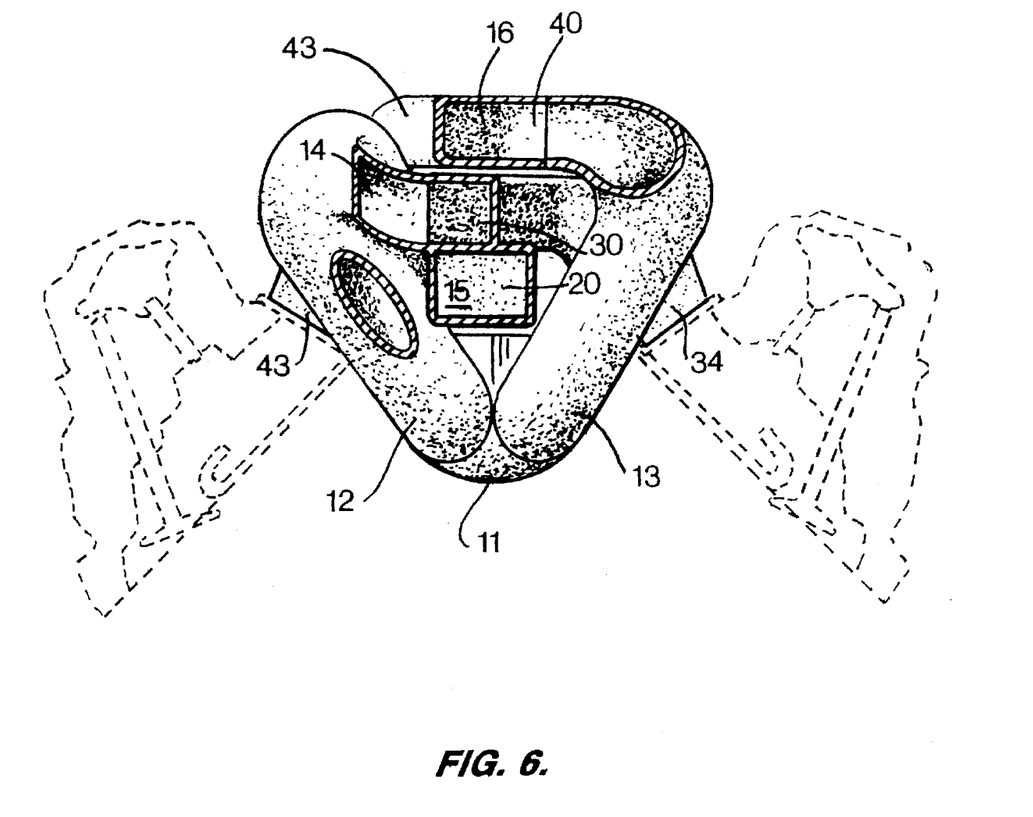
FIG. 6 is a cross-sectional view Of the manifold taken along line 6—6 of FIG. 3, the mounting flange used to connect the manifold to the engine and the engine cylinder heads being shown in dashed lines.

With this engine, the manifold 10 is arranged so that the distribution section 15 located in the lower layer 20 supplies cylinders 1 and 6 through air intake port extensions 21 and 26, respectively. Distribution sections located in the middle layer 30 supplies cylinders 4 and 7 through air intake port extensions 34 and 37, respectively. Distribution sections 16, 17 in the upper layer 40 supply cylinders 2 and 3; 5 and 8, respectively, through air intake port extensions 42 and 43; 45 and 48, respectively.

As indicated by the firing order, ignition of cylinder 6 is separated from the ignition of cylinder 1 but an interval corresponding to 360 degrees of crankshaft revolution. Similarly, cylinders 8 and 5, cylinders 4 and 7, cylinders 3 and 2 are ignited at time intervals which are separated by 360 degrees of crankshaft revolution. Therefore, the sharing of the same distribution section 15, 17, 14, 16 by pairs of cylinders 1 and 6, 8 and 5, 4 and 7, 3 and 2, respectively, has no adverse effect on the opening of the intake valve of either cylinder in each of these pairs.

Moreover, after the intake valve for cylinder 1 opens, cylinder 8, the next cylinder to receive intake flow, is fed through the distribution section 17 in the upper layer 40 by air intake port extension 48. Extension 48 is spatially separated from extension 21, which has just fed cylinder 1, by four distinguishable fluid flow channels defined by transfer sections 12 and 13 and by distribution sections 15 and 17. Hence, manifold 10 provides good separation between the intake flow for cylinder 8 and the pressure pulse created by the closing of the intake valve of cylinder 1.

Similarly, cylinder 4, the next cylinder to receive intake flow after cylinder 8, is fed through the distribution section 14 in the middle layer 30 by air intake port extension 34. Extension is spatially separated from extension 48, Which has just fed cylinder 8, by four distinguishable fluid flow channels defined by transfer sections 12 and 13 and by distribution sections 14 and 17.

Likewise, cylinder 3, the next cylinder to receive intake flow after cylinder 4, is fed through the distribution section 16 in the upper layer 40 by air intake port extension 43. Extension is spatially separated from extension 34, which has just fed cylinder 4, by four distinguishable fluid flow channels defined by transfer sections 12 and 13 and by distribution sections 14 and 16.

After cylinder 3, cylinder 6, the next cylinder to receive intake flow, is fed through the distribution section 15 in the lower layer 20 by air intake port extension 26. Extension 26 is spatially separated from extension 43, which has just cylinder 3, by four distinguishable fluid flow channels defined by transfer sections 12 and 13 and by distribution sections 15 and 16.

Next after cylinder 6, cylinder 5 receives intake flow fed through the distribution section 17 in the upper layer 40 by air intake port extension 45. Extension 45 is spatially separated from extension 26, which has just fed cylinder 6, by four distinguishable fluid flow channels defined by transfer sections 12 and 13 and by distribution sections 15 and 17.

Immediately following cylinder 5, cylinder 7 is the next cylinder to receive intake flow; and it is fed through the distribution section 14 in the middle layer 30 by air intake port extension 37. Extension 37 is spatially separated from extension 45, which has just fed cylinder 5, by four distinguishable fluid flow channels defined by transfer sections 12 and 13 and by distribution sections 14 and 17.

After cylinder 7, cylinder 2, the next cylinder to receive intake flow, is fed through the distribution section 16 in the upper layer 40 by air intake port extension 42. Extension 42 is spatially separated from extension 37, which has just fed cylinder 7, by four distinguishable fluid flow channels defined by transfer sections 12 and 13 and by distribution sections 14 and 16.

The next cylinder to fire again is cylinder 1 restarting the firing sequence. Cylinder 1 is fed through distribution section 15 in the lower layer 20 by extension 21 which is spatially separated from extension 42 by four distinguishable fluid flow channels defined by transfer sections 12 and 13 and by distribution sections 15 and 16.

For each of the cylinders—cylinders 8, 4, 3, 6, 5, 7, 2, 1, the manifold 10 provides good separation between the intake flow for each individual cylinder and the pressure pulse created by the cloying of the intake valve of cylinder 1, 8, 4, 3, 5, 6, 7, 2, 1, respectively.

An alternate embodiment of the improved manifold is shown in FIGS. 7–10 and is indicated generally by the reference numeral 100. The manifold 100, as illustrated in the drawings, is designed for use with an eight-cylinder engine wherein the cylinders are arranged in two banks of four cylinders each arranged in a V pattern commonly called a V-8 engine, but with the Crankshaft being dedicated to a firing order which works with the manifold 100: specifically, a firing order of 1-6-5-2-3-8-7-4.

Figure 7:
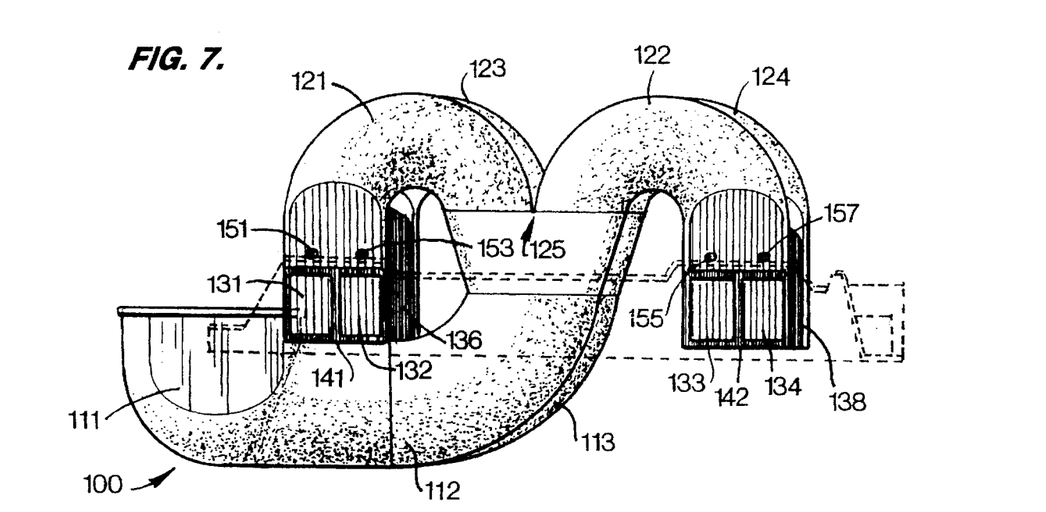
FIG. 7 is a side elevational view of an alternate embodiment of the intake manifold according to the present invention, the mounting flange used to connect the manifold to the engine being shown in dashed lines.
Figure 8:
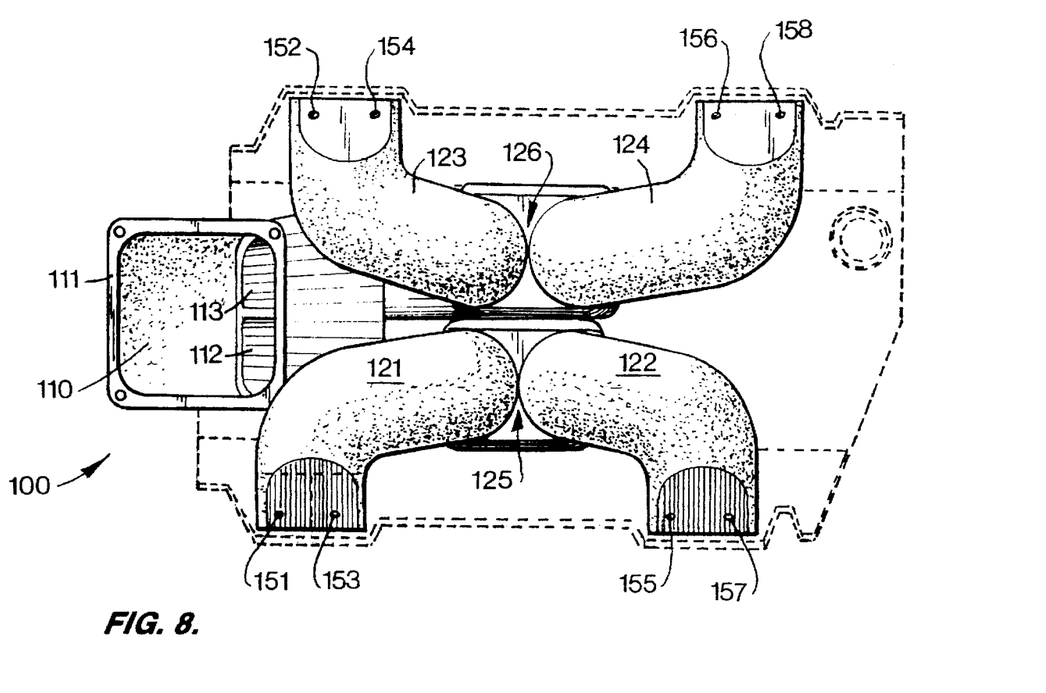
FIG. 8 is a top plan view of the manifold according to FIG. 7, the mounting flange used to connect the manifold to the engine being shown in dashed lines.
Figure 9:
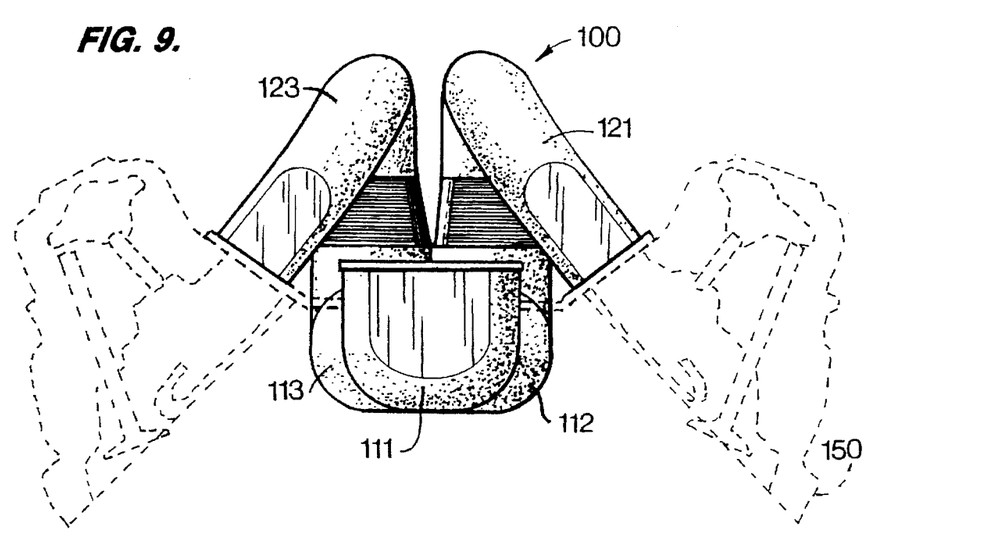
FIG. 9 is a front end view of the manifold according to FIG. 7, the mounting flange used to connect the manifold to the engine and the engine cylinder heads being shown in dashed lines.
Figure 10:
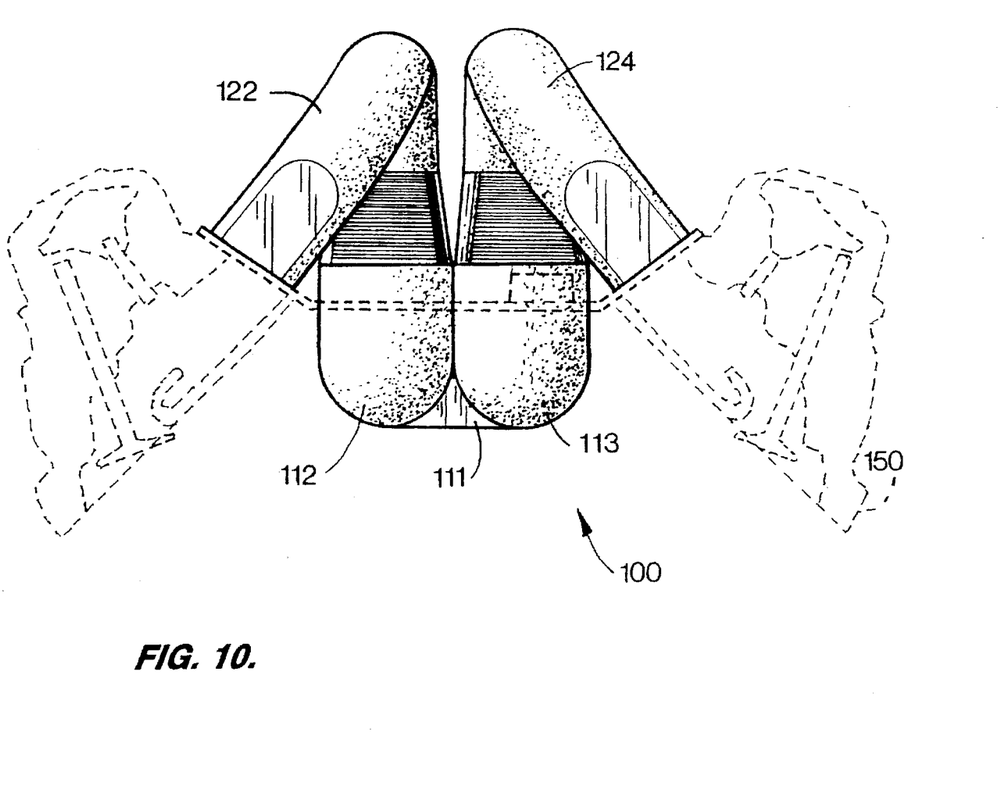
FIG. 10 is a rear end view of the manifold according FIG. 7, the mounting flange used to connect the manifold to the engine and the engine cylinder heads being shown in dashed lines.

For an eight-cylinder engine, the manifold 100 can be characterized generally as comprising seven Ys and has the following major components: an air inlet section 111; transfer sections 112, 113; distribution sections 121, 122, 123, 124; air intake port extensions 131, 132, 133, 134, 135, 136, 137, 138. The air inlet section 111 is fluidly connected to the transfer sections 112 and 113 through a Y. The transfer section 112 is fluidly connected to the distribution sections 121 and 122 through a Y 125, and the transfer section 113 is fluidly connected to the distribution sections 123 and 124 through a Y 126. The peripheries of transverse cross-sections of fluid flow channels formed by the distribution sections 121, 122, 123, 124 are generally circular in shape. Each distribution section 121, 122, 123, 124 is split into two intake port extensions by flow dividers. As shown in FIG. 7, distribution sections 121 and 122 are split into extensions; 131; 132; 133, 134, respectively, by flow dividers 141, 142, respectively. Each of the intake port extensions also has a port 151, 152, 153, 154, 155, 156, 157, 158, for mounting fuel injectors (not shown) when they are utilized in the engine.

EXAMPLE 2

The manifold 100 performs for four-stroke, V-8 engine as follows: A pulse of air or of fuel/air mixture for engine charge enters the air inlet section 111 at opening 110 every 90 degrees of crankshaft revolution. Downstream of the section 111, the pulse is diverted into one of two transfer sections 112, 113, each of these transfer sections receiving such a pulse each 180 degrees of crankshaft revolution. Further downstream, the distribution sections 121, 122, 123, 124 each receive such a pulse of air every 360 degrees of crankshaft revolution, and the air intake port extensions 131, 132, 133, 134, 135, 136, 137, 138 each receive such a pulse every 720 degrees of crankshaft revolution.

Figure 11:
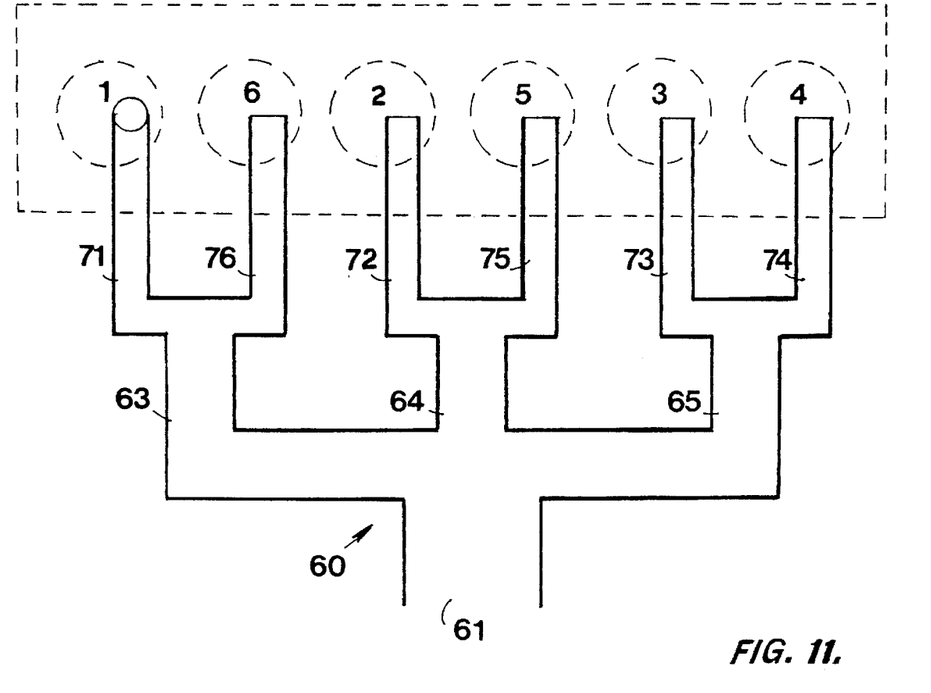
FIGS. 11 and 12 are schematics of alternate embodiments of the manifold according to the present invention, the embodiments being useful on an inline six-cylinder engine and on a V-6 engine such as the Chevrolet, respectively.
Figure 12:
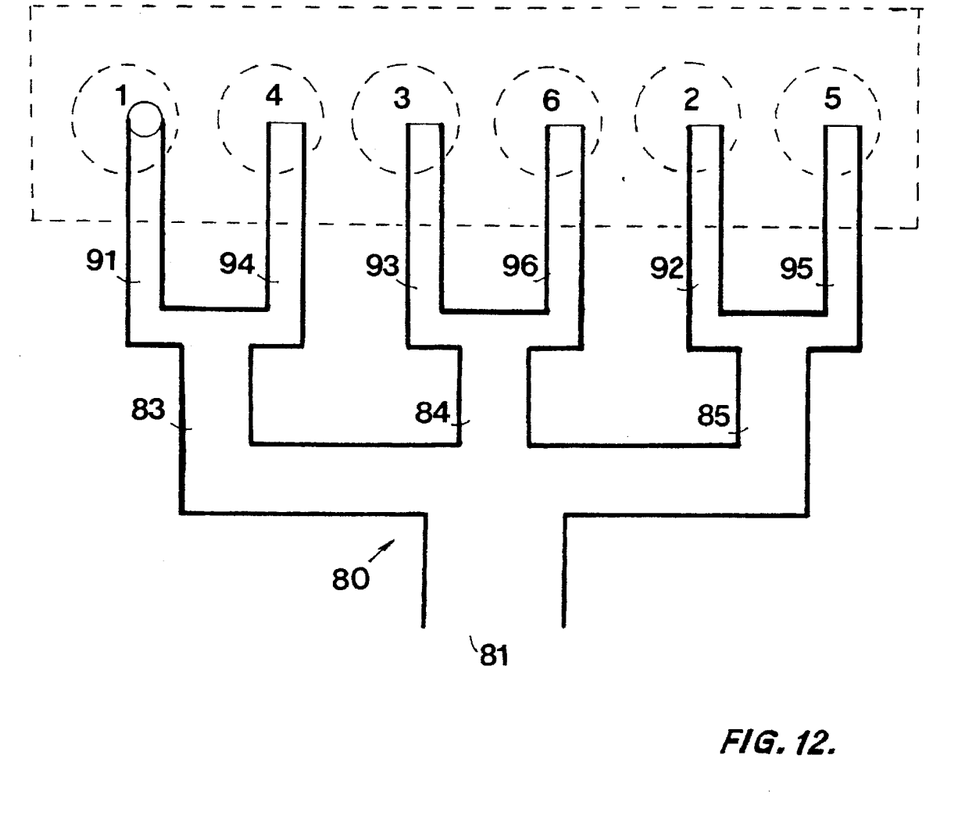

Further alternate embodiments are shown schematically in FIGS. 11 and 12 and are indicated generally by the reference numerals 60 and 80, respectively. The manifold 60 is designed for use with an inline six-cylinder engine wherein the cylinders number from 1 to 6 from the front of the engine and have a firing order of 1-5-3-6-2-4. The manifold 80, on the other hand, is designed for use a six-cylinder engine wherein the cylinders are arranged, in a V pattern, in two banks of three cylinders each, the engine being commonly called a V-6 engine and having a firing order of 1-6-5-4-3-2.

EXAMPLE 3

The manifold 60 performs as follows: A pulse of air or of fuel/air mixture for engine charge enters the air inlet section at opening 61 every 12.0 degrees of crankshaft revolution. Downstream of the opening 61, the pulse is diverted into one of three distribution sections 63, 64, 65, each of these distribution sections receiving such a pulse every 360 degrees of crankshaft revolution. Further downstream, air intake port extensions 71, 72, 73, 74, 75, 76 each receive Such a pulse every 720 degrees of crankshaft revolution. These intake port extensions correspond to cylinders 1, 2, 3, 4, 5, 6, respectively.

EXAMPLE 4

The manifold 80 performs as follows: A pulse of air or of fuel/air mixture enters the air inlet section at opening 81 every 120 degrees of crankshaft revolution. Downstream of the opening 81, the pulse is diverted into one of three distribution sections 83, 84, 85, each of these distribution sections receiving such a pulse every 360 degrees of crankshaft revolution. Further downstream, air intake port extensions 91, 92, 93, 94.95, 96 each receive such a pulse every 720 degrees of crankshaft revolution. These intake port extensions correspond to cylinders 1, 2, 3, 4, 5, 6, respectively.

It is also understood that whereas the invention has been fully described in detail with reference to four preferred embodiments, nevertheless various other embodiments and variants are possible which are in the spirit and scope of the present of invention, and such embodiments and variants are intended to be covered by the following claims.

It is claimed:

1. A manifold for a multi-cylinder internal combustion engine, wherein the internal combustion engine includes a crankshaft and defines a firing order, the manifold comprising:

an air inlet section;

a plurality of port extensions in an even quantity above four; and a plurality of distribution sections in a quantity equal to one-half the number of port extensions of said plurality of port extension, wherein said air inlet section, each distribution section of said plurality of distribution sections, and each port extension of said plurality of port extensions define through passageways for conveying flow to the cylinders, wherein each distribution section of said plurality of distribution sections branches solely into two port extensions of said plurality of port extensions, wherein each distribution section of said plurality of distribution sections is fluidly connected to said air inlet section; and wherein each port extension of said plurality of port extensions is constructed and arranged to individually communicate with and provide flow to an individual cylinder of the plurality of cylinders such that each port extension of said plurality of port extensions receives a pulse every time the crankshaft rotates a number of degrees that is approximately equal to the number of degrees the crankshaft rotates from the beginning of the firing order to the end of the firing order, and wherein the manifold is constructed and arranged such that, each distribution section of said plurality of distribution sections receives a pulse every time the crankshaft rotates a number of degrees that is approximately equal to the number of degrees the crankshaft rotates from the beginning of the firing order to halfway through the firing order, and all of the pulses within each individual distribution section of said plurality of distribution sections are separated by a number of degrees that is approximately equal to the number of degrees the crankshaft rotates from the beginning of the firing order to halfway through the firing order.

2. The manifold of claim 1, wherein the manifold is constructed and arranged so that said air inlet section receives a pulse every time the crankshaft rotates a certain number of degrees and all of the pulses within said air inlet section are separated by approximately the same number of degrees of crankshaft revolution.

3. The manifold of claim 2, wherein the manifold further includes a plurality of transfer sections fluidly connected between said air inlet section and said plurality of distribution sections, wherein the manifold is constructed and arranged so that two distribution sections of said plurality of distribution sections are fluidly connected to and extend from each transfer section of said plurality of transfer sections such that each transfer section of said plurality of transfer sections branches solely into two distribution sections of said plurality of distribution sections, and each transfer section of said plurality of transfer sections receives a pulse every time said crankshaft rotates a number of degrees that is approximately equal to the number of degrees the crankshaft rotates from the beginning of the firing order to one quarter of the way through the firing order, and all of the pulses within each individual transfer section of said plurality of transfer sections are separated by a number of degrees that is approximately equal to the number of degrees the crankshaft rotates from the beginning of the firing order to one quarter of the way through the firing order.

4. The manifold of claim 3, wherein two transfer sections of said plurality of transfer sections are fluidly connected to and extend from said air inlet section such that said air inlet section branches solely into two transfer sections of said plurality of transfer sections.

5. The manifold of claim 1, wherein three distribution sections of said plurality of distribution sections are fluidly connected to and extend from said air inlet section such that said air inlet section branches solely into three distribution sections of said plurality of distribution sections, and wherein the manifold is constructed and arranged so that said air inlet section receives a pulse every time the crankshaft rotates a number of degrees that is approximately equal to the number of degrees the crankshaft rotates from the beginning of the firing order to one sixth of the way through the firing order, and all of the pulses within said air inlet section are separated by a number of degrees that is approximately equal to the number of degrees the crankshaft rotates from the beginning of the firing order to one sixth of the way through the firing order.

6. In combination:

an internal combustion engine wherein said internal combustion engine includes a crankshaft and a plurality of cylinders, wherein said plurality of cylinders includes an even number of cylinders greater than four, and wherein said internal combustion engine defines a firing order; and an intake manifold including, an air inlet section, a plurality of distribution sections in a quantity equal to one-half the number of cylinders, wherein distribution sections of said plurality of distribution sections are fluidly connected to said air inlet section, and a plurality of port extensions in a quantity equal to the number of cylinders, wherein each distribution section of said plurality of distribution sections branches into two port extensions of said plurality of port extensions, wherein said air inlet section, each distribution section of said plurality of distribution sections, and each port extension of said plurality of port extensions define through passageways for conveying flow to said plurality of cylinders, wherein each port extension of said plurality of port extensions communicates with and provides flow to an individual cylinder of said plurality of cylinders such that each port extension of said plurality of port extensions receives a pulse every time said crankshaft rotates a number of degrees that is approximately equal to the number of degrees said crankshaft rotates from the beginning of said firing order to the end of said firing order, and wherein said manifold is constructed and arranged and cooperates with said engine such that each distribution section of said plurality of distribution sections receives a pulse every time said crankshaft rotates a number of degrees that is approximately equal to the number of degrees said crankshaft rotates from the beginning of said firing order to halfway through said firing order, and all of the pulses within each individual distribution section of said plurality of distribution sections are separated by a number of degrees that is approximately equal to the number of degrees said crankshaft rotates from the beginning of said firing order to halfway through the firing order.

7. The combination of claim 6, wherein said manifold further includes a plurality of transfer sections fluidly connected between said air inlet section and said plurality of distribution sections, wherein two distribution sections of said plurality of distribution sections are fluidly connected to and extend from each transfer section of said plurality of transfer sections such that each transfer section of said plurality of transfer sections branches into two distribution sections of said plurality of distribution sections, wherein each transfer section of said plurality of transfer sections receives a pulse every time said crankshaft rotates a number of degrees that is approximately equal to the number of degrees said crankshaft rotates from the beginning of the firing order to one quarter of the way through the firing order, and wherein all of the pulses within each individual transfer section of said plurality of transfer sections are separated by a number of degrees that is approximately equal to the number of degrees said crankshaft rotates from the beginning of the firing order to one quarter of the way through the firing order.

8. The combination of claim 7, wherein two transfer sections of said plurality of transfer sections are fluidly connected to and extend from said air inlet section, wherein said air inlet section receives a pulse every time said crankshaft rotates a number of degrees that is approximately equal to the number of degrees said crankshaft rotates from the beginning of the firing order to one eighth of the way through the firing order, and wherein all of the pulses within each individual transfer section of said plurality of transfer sections are separated by a number of degrees that is approximately equal to the number of degrees said crankshaft rotates from the beginning of the firing order to one eighth of the way through the firing order.

9. The combination of claim 8, wherein said internal combustion engine is an eight cylinder four-stroke internal combustion engine, wherein each port extension of said plurality of port extensions receives a pulse approximately every 720 degrees of crankshaft revolution and all pulses within each individual port extension of said plurality of port extensions are separated by approximately 720 degrees of crankshaft revolution, wherein each distribution section of said plurality of distribution sections receives a pulse approximately every 360 degrees of crankshaft revolution and all pulses within each individual distribution of said plurality of distribution sections are separated by approximately 360 degrees of crankshaft revolution, wherein each transfer section of said plurality of transfer sections receives a pulse approximately every 180 degrees of crankshaft revolution and all pulses within each individual transfer section of said plurality of transfer sections are separated by approximately 180 degrees of crankshaft revolution, and wherein said air inlet section receives a pulse approximately every 90 degrees of crankshaft revolution and all pulses within said air inlet section are separated by approximately 90 degrees of crankshaft revolution.

10. The combination of claim 6, wherein three distribution sections of said plurality of distribution sections are fluidly connected to and extend from said air inlet section such that said air inlet section branches into three distribution sections of said plurality of distribution sections, and wherein said air inlet section receives a pulse every time said crankshaft rotates a number of degrees that is approximately equal to the number of degrees said crankshaft rotates from the beginning of the firing order to one sixth of the way through the firing order, and wherein all of the pulses within said air inlet section are separated by a number of degrees that is approximately equal to the number of degrees said crankshaft rotates from the beginning of the firing order to one sixth of the way through the firing order.

11. The combination of claim 6, wherein said air inlet section receives a pulse every time said crankshaft rotates a certain number of degrees and all of the pulses within said air inlet section are separated by approximately the same number of degrees of crankshaft revolution, and wherein the interval between the pulses in said air inlet section is less than the interval between pulses in an individual distribution section of said plurality of distribution sections.

12. The combination of claim 11, wherein said plurality of cylinders includes
 a first cylinder,
 a second cylinder that is adjacent to and halfway through said firing order from said first cylinder,
 a third cylinder, and
 a fourth cylinder that is adjacent to and halfway through said firing order from said third cylinder, wherein said first cylinder of said plurality of cylinders and said second cylinder of said plurality of cylinders receive flow through a first distribution section of said plurality of distribution sections, and wherein said third cylinder of said plurality of cylinders and said fourth cylinder of said plurality of cylinders receive flow through a second distribution section of said plurality of distribution sections.

13. The combination of claim 11, wherein said firing order is sequential.

14. In combination:

an internal combustion engine
 wherein said internal combustion engine includes a crankshaft and a plurality of cylinders, wherein said plurality of cylinders includes an even number of cylinders greater than four, and
 wherein said internal combustion engine defines a firing order; and a manifold defining,
 a plurality of first level passages in a quantity equal to the number of cylinders, wherein each first level passage of said plurality of first level passages communicates with an individual cylinder of said plurality of cylinders such that each first level passage of said plurality of first level passages receives a pulse every time said crankshaft rotates a number of degrees that is approximately equal to the number of degrees said crankshaft rotates from the beginning of said firing order to the end of said firing order, and
 a plurality of second level passages in a quantity equal to one-half the number of cylinders, wherein each second level passage of said plurality of second level passages branches into two first level passages of said plurality of first level passages, wherein said manifold is constructed and arranged and cooperates with said engine such that
 each second level passage of said plurality of second level passages receives a pulse every time said crankshaft rotates a number of degrees that is approximately equal to the number of degrees said crankshaft rotates from the beginning of said firing order to halfway through said firing order, and
 all of the pulses within each individual second level passage of said plurality Of second level passages are separated by a number of degrees that is approximately equal to the number of degrees said crankshaft rotates from the beginning of the firing order to halfway through the firing order.

15. The combination of claim 14, wherein said plurality of cylinders includes
 a first cylinder,
 a second cylinder that is adjacent to and halfway through said firing order from said first cylinder,
 a third cylinder, and
 a fourth cylinder that is adjacent to and halfway through said firing order from said third cylinder, wherein said first cylinder of said plurality of cylinders and said second cylinder of said plurality of cylinders breathe through a first distribution section of said plurality of distribution sections, and wherein said third cylinder of said plurality of cylinders and said fourth cylinder of said plurality of cylinders breathe through a second distribution section of said plurality of distribution sections.

16. The combination of claim 14, wherein said manifold further includes an additional passage, wherein at least two second level passages of said plurality of second level passages branch into said additional passage.

17. The combination of claim 15, wherein said firing order is sequential.

18. The combination of claim 15, wherein the additional passage receives a pulse every time said crankshaft rotates a certain number of degrees and all of the pulses within said additional passage are separated by approximately the same number of degrees of crankshaft revolution, and wherein the interval between the pulses in said additional passage is less than the interval between pulses in an individual second level passage of said plurality of second level passages.

19. The combination of claim 16, wherein three second level passages of said plurality of second level passages are fluidly connected to and extend from said additional passage such that said additional passage branches into three second level passages of said plurality of second level passages, wherein said additional passage receives a pulse every time said crankshaft rotates a number of degrees that is approximately equal to the number of degrees said crankshaft rotates from the beginning of the firing order to one sixth of the way through the firing order, and wherein all of the pulses within said additional passage are separated by a number of degrees that is approximately equal to the number of degrees said crankshaft rotates from the beginning of the firing order to one sixth of the way through the firing order.

20. In combination:

an internal combustion engine
 wherein said internal combustion engine includes a crankshaft and a plurality of cylinders, wherein said plurality of cylinders includes an even number of cylinders greater than four, and
 wherein said internal combustion engine defines a firing order; and a manifold defining,
 a plurality of first level passages in a quantity equal to the number of cylinders, wherein each first level passage of said plurality of first level passages communicates with an individual cylinder of said plurality of cylinders such that each first level passage of said plurality of first level passages receives a pulse every time said crankshaft rotates a number of degrees that is approximately equal to the number of degrees said crankshaft rotates from the beginning of said firing order to the end of said firing order,
 a plurality of second level passages in a quantity equal to one-half the number of cylinders, wherein each second level passage of said plurality of second level passages branches into two first level passages of said plurality of first level passages, and a plurality of third level passages in a quantity equal to one-fourth the number of cylinders, wherein each third level passage of said plurality of third level passages branches into two second level passages of said plurality of second level passages, wherein said manifold is constructed and arranged and cooperates with said engine such that each second level passage of said plurality of second level passages receives a pulse every time said crankshaft rotates a number of degrees that is approximately equal to the number of degrees said crankshaft rotates from the beginning of said firing order to halfway through said firing order, all of the pulses within each individual second level passage of said plurality of second level passages are separated by a number of degrees that is approximately equal to the number of degrees said crankshaft rotates from the beginning of the firing order to halfway through the firing order, each third level passage of said plurality of third level passages receives a pulse every time said crankshaft rotates a number of degrees that is approximately equal to the number of degrees said crankshaft rotates from the beginning of the firing order to one quarter of the way through the firing order, and all of the pulses within each individual third level passage of said plurality of third level passages are separated by a number of degrees that is approximately equal to the number of degrees said crankshaft rotates from the beginning of the firing order to one quarter of the way through the firing order.

21. The combination of claim 20, wherein said manifold includes an additional passage that is connected to and communicates with each third level passage of said plurality of third level passages, and wherein said additional passage receives a pulse every time said crankshaft rotates a certain number of degrees and all of the pulses within said additional passage are separated by approximately the same number of degrees of crankshaft revolution.

22. The combination of claim 20, wherein said manifold includes an additional passage that is connected to and communicates with two third level passages of stud plurality of third level passages such that said additional passage branches into two third level passages of said plurality of third level passages, wherein said additional passage receives a pulse every time said crankshaft rotates a number of degrees that is approximately equal to the number of degrees said crankshaft rotates from the beginning of the firing order to one eight of the way through the firing order, and wherein all of the pulses within said additional passage are separated by a number of degrees that is approximately equal to the number of degrees said crankshaft rotates from the beginning of the firing order to approximately one eighth of the way through the firing order.

23. A manifold comprising:

a structure defining a plurality of passages, wherein each passage of said plurality of passages includes opposite ends including a first end, and a second end, and an elongated midspan interposed between and extending between said first end and said second, and in direct communication substantially solely with said first and said second end, wherein passages of said plurality of passages join at a first furcation, wherein said first furcation provides direct communication substantially solely between said second end of a first passage of said plurality of passages, said first end of a second passage of said plurality of passages, said first end of a third passage of said plurality of passages, and said first end of a fourth passage of said plurality of passages, and wherein said first furcation provides the sole direct communication between said ends of said plurality of passages and said second end of said first passage, said first end of said second passage, said first end of said third passage, and said first end of said fourth passage, wherein passages of-said plurality of passages join at a second furcation, wherein said second furcation provides direct communication substantially solely between said second end of said second passage of said plurality of passages, said first end of a fifth passage of said plurality of passages, and said first end of a sixth passage of said plurality of passages, and wherein said second furcation provides the sole direct communication between said ends of said plurality of passages and said second end of said second passage, said first end of said fifth passage, and said first end of said sixth passage, wherein passages of said plurality of passages join at a third furcation, wherein said third furcation provides direct communication substantially solely between said second end of said third passage of said plurality of passages, said first end of a seventh passage of said plurality of passages, and said first end of a eighth passage of said plurality of passages, and wherein said third furcation provides the sole direct communication between said ends of said plurality of passages and said second end of said third passage, said first end of said seventh passage, and said first end of said eighth passage, and wherein passages of said plurality of passages join at a fourth furcation, wherein said-fourth furcation provides direct communication substantially solely between said second end of said fourth passage of said plurality of passages, said first end of a ninth passage of said plurality of passages, and said first end of a tenth passage of said plurality of passages, and wherein said fourth furcation provides the sole direct communication between said ends of said plurality of passages and
said second end of said fourth passage,
said first end of said ninth passage, and
said first end of said tenth passage.

24. A manifold for a multi-cylinder internal combustion engine having a crankshaft and an even number of cylinders greater than four, and defining a firing order, the manifold defining:

a plurality of first level passages in a quantity equal to the number of cylinders, wherein each first level passage of said plurality of first level passages is for communicating with an individual cylinder of the plurality of cylinders such that each first level passage of said plurality of first level passages receives a pulse every time the crankshaft rotates a number of degrees that is approximately equal to the number of degrees the crankshaft rotates from the beginning of the firing order to the end of the firing order, and a plurality of second level passages in a quantity equal to one-half the number of cylinders, wherein each second level passage of said plurality of second level passages branches into two first level passages of said plurality of first level passages, wherein said manifold is constructed and arranged such that each second level passage of said plurality of second level passages receives a pulse every time the crankshaft rotates a number of degrees that is approximately equal to the number of degrees the crankshaft rotates from the beginning of the firing order to halfway through the firing order, and all of the pulses within each individual second level passage of said plurality of second level passages are separated by a number of degrees that is approximately equal to the number of degrees the crankshaft rotates from the beginning of the firing order to halfway through the firing order.

25. The manifold of claim 24, wherein each of said second level passages of said plurality of second level passages are interconnected.

* * * * *